July 28, 1970   A. D. STRUBLE, JR   3,521,836
INFLATED BUOYANT WING

Original Filed Sept. 24, 1965   6 Sheets-Sheet 1

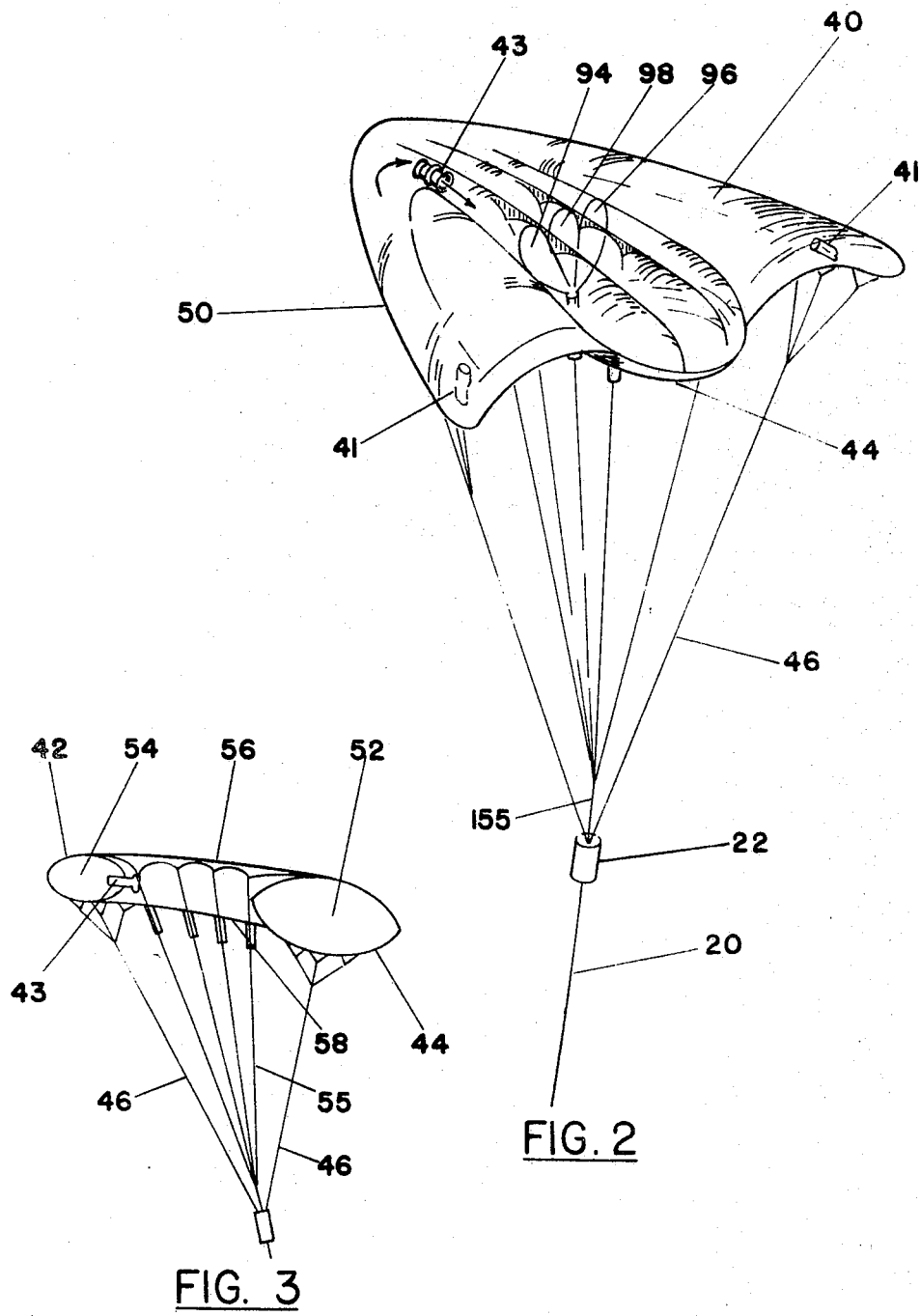

July 28, 1970   A. D. STRUBLE, JR   3,521,836
INFLATED BUOYANT WING

Original Filed Sept. 24, 1965

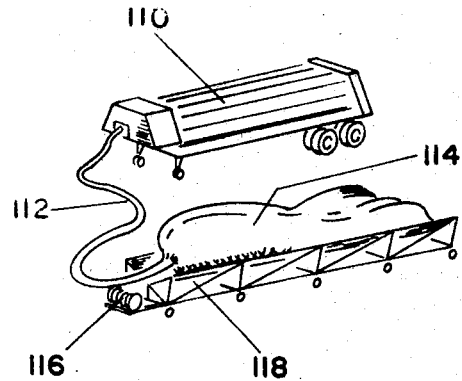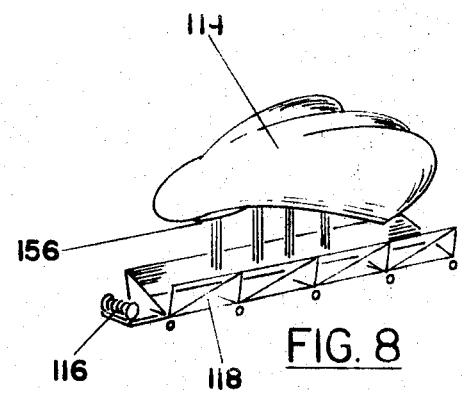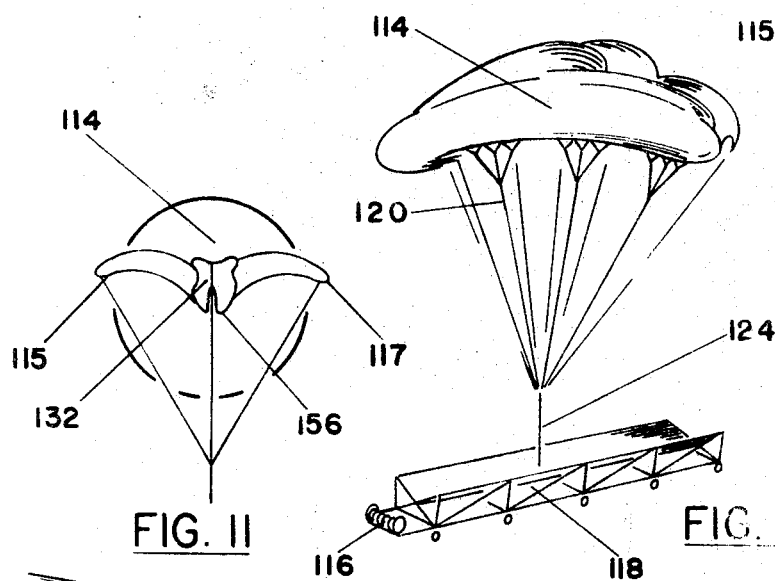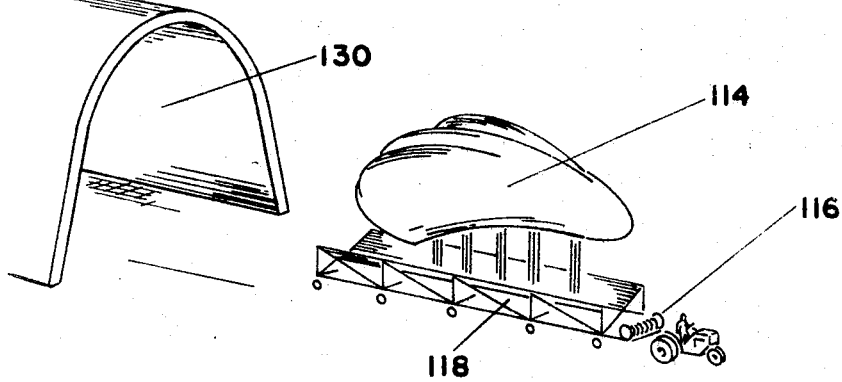

United States Patent Office 3,521,836
Patented July 28, 1970

3,521,836
INFLATED BUOYANT WING
Arthur D. Struble, Jr., 1754 S. Crenshaw Blvd.,
Torrance, Calif. 90501
Continuation of application Ser. No. 489,888, Sept. 24,
1965. This application Aug. 6, 1968, Ser. No. 751,698
Int. Cl. B64b 1/50, 1/42; B64f 1/12
U.S. Cl. 244—33   8 Claims

ABSTRACT OF THE DISCLOSURE

An inflated buoyant wing and method of pressuring and launching the wing, including a generally delta-shaped wing, having a central inflatable section controlled by superpressuring lines, inflated booms along the outside edges of the wings separated from the central portion by appropriate one-way check valves and a turbine means including an electrical generator, a reel means fixedly attached to the lower end of load lines connected to the wing and having a reel about which the superpressure line is wound and from which a tethering line extends, an electrical generator coupled to the tethering line reel and a trough-shaped land-based carrier vehicle having a generally elongated trough-shape, and including hook means for coupling the pressure lines and the load lines together at spaced points along the vehicle and at spaced points vertically below the first mentioned points along the trough and a winch means connected to the lines, adapted to pull the previously mentioned lines downwardly in a vertical fashion until the wing is in contact with the trough-shaped carrier.

This is a continuation of Ser. No. 489,888 filed Sept. 24, 1965, now abandoned.

The present invention relates to an inflated, buoyant wing and method of apparatus for pressuring and launching the wing.

In many cases, both in the military and civilian area of use, many needs are found for vehicles which will loft or carry an item of equipment to a point spaced above the surface of the earth and either hold the equipment in this position or move it from one geographic location to another. While such vehicles could of course be motor-driven, this is not practical in cases where the vehicle is to be used to support measuring or testing equipment, for the transmission of information, or the like, over extended periods of time.

Therefore, in accordance with the present invention an improved inflated, buoyant wing is provided together with a method and apparatus for superpressuring and launching this novel wing.

FIG. 1 of the drawings shows a bottom, isometric view of the inflated, buoyant wing;

FIG. 2 shows a top view of a modified version of the inflated, buoyant wing;

FIG. 3 is a sectional view of the wing of FIG. 2;

FIGS. 7, 8, 9, 10, 11 and 12 are views of the inflated, buoyant wing and means for launching the wing, showing various stages in the launching operation;

Figure 1:
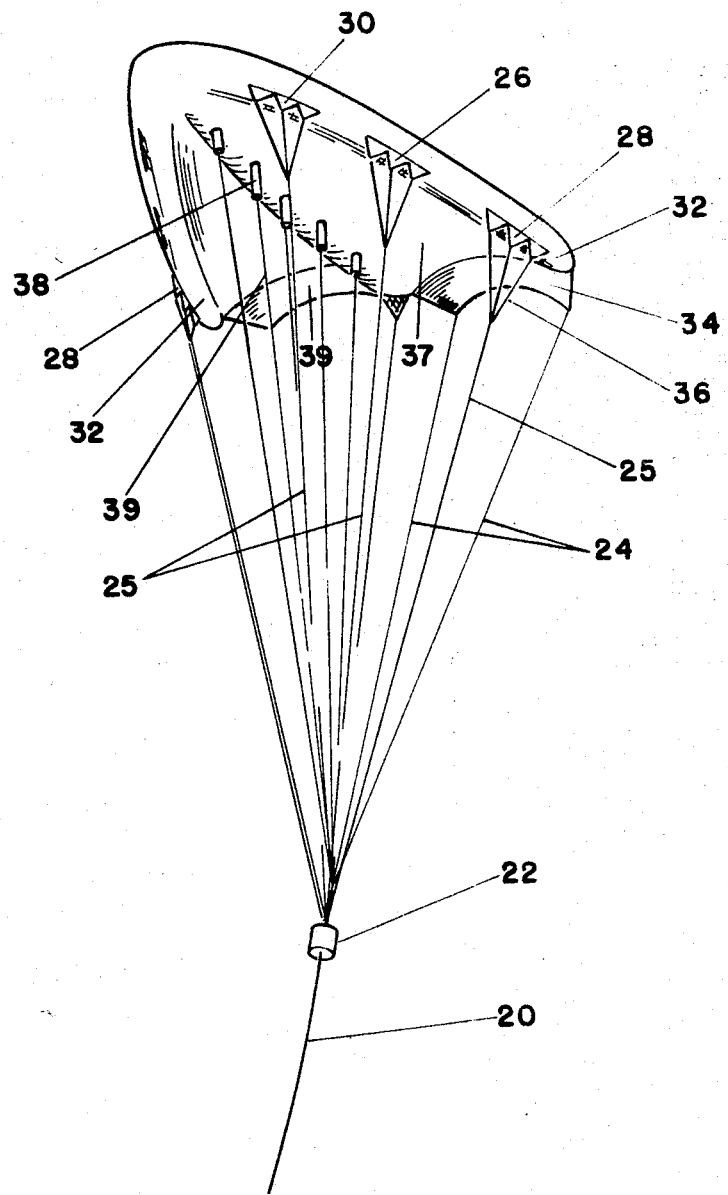

Referring now in detail to FIG. 1, the numeral 20 shows a tethering line or a line adapted to support a load. Element 22, which is mounted at the point of confluence of the various control and load lines of the vehicle, is a suitable container carrying a reel or other mechanism for manipulating the control line from a remote position and also, in some cases, for generating electricity. Generally fixed to container 22 are control flap lines 24. Control flap lines 24 may also pass over an appropriate reel or the like in container 22 to permit manipulation of the control lines and the hereinafter mentioned control flap. Appropriate load lines 25 are also attached to container 22 and lead to load webs 26, 28 and 30, respectively. Load webs 26, 28 and 30 are attached to side booms 32 of the generally delta-shaped wing or vehicle body. Booms 32 form the side edges of the vehicle body and meet at a point at the front of the body. Attached at the rear of the body are the control flaps 34. Control flaps 34 may be manipulated by means of lines 24 to thereby cause the vehicle to change its orientation. Load webs 26, 28 and 30 are connected to load lines 25 by means of tie lines 36. The wing unit also has an enlarged or generally tube-shaped center section 37. Leading from center section 37 are superpressure tubes 38. Passing into superpressuring tubes 38 are superpressure lines 39 which are adapted, as will be pointed out hereinafter, to enlarge or contract the volume of the wing and thus to superpressure the same.

FIG. 2 and FIG. 3 show a modified version of the vehicle of FIG. 1. As in FIG. 1 the tether line or object support line 20 passes to reel or control container 22. Leading upwardly to the inflated wing from container 22 are load lines 46 which are attached to the sides of the wing-shaped vehicle. The vehicle itself is in this instance compartmented and therefore comprises the side or boom sections 40 and 50 which are inflated. The center section, which is also inflated, has a three petal configuration made up of petals 94, 96 and 98. The center section also has formed at its front and rear ends respectively passive reflective surfaces, such as 44, which permit the use of the vehicle for reflecting signals or the like therefrom. This reflective surface 44 forms a rear chamber 52 in open communication with the petal sections 94, 96 and 98. The front point of the wing 42 forms chamber 54 which is in open communication with the chambers formed in booms 40 and 50. The petal or center section and chamber 52 are separated from boom sections 40 and 50 and chamber 54 by check valves 41 which prevent the flow of gas from the boom sections to chamber 52 but permit flow in the opposite direction from the chamber 54 to the petal or center section, shown by the arrows in FIG. 2. Separating chamber 54 and boom sections 40 and 50 from the petal sections 94, 96 and 98 and chamber 52 is a turbine 43. It will be seen that the volume of the center section and chamber 52 may be changed deliberately by pulling superpressure lines 55 which are attached to internally disposed curtains 56. It will be noted that when the volume of the center section is reduced this changes the pressure relationship between the boom sections and chamber 54 versus the center section and chamber 52. In other words, the pressure in the boom section and chamber 54 may be higher or lower than the pressure in the center section and chamber 52. If the pressure is higher in boom sections 40 and 50 and chamber 54 the higher pressure may be bled through turbine 43 to the center section and chamber 52 to equalize the pressure and during such bleeding through turbine 43 electrical power can be generated. This of course will take the place of expensive power generating equipment heretofore utilized. In FIG. 3 the numeral 58 designates the bottom of the center section while 55 represents the superpressure lines for superpressure control.

Figure 4:
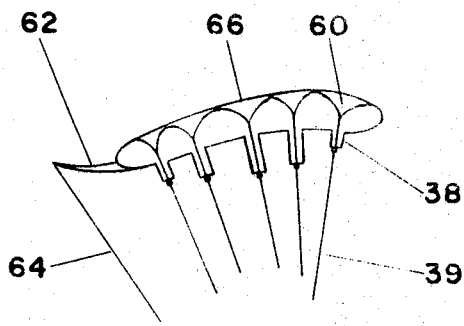
FIG. 4 is a cross section of the wing of FIG. 1, generally showing one means of superpressuring the wing.

FIG. 4 shows a sectional view of a vehicle, such as that of FIG. 1, wherein the volume and therefore the superpressure in the vehicle can be controlled. In the vehicle shown in FIG. 4, the vehicle is made up of the main body or wing 66. Wing 66 has formed on its rearward end control flap 62 which is controlled from a remote point through control line 64. Internally disposed along the length of body section 66 is internal curtain 60. Attached to the bottom of internal curtain 60 are superpressure control lines 39. Superpressure control lines 39 pass through superpressure tubes 38.

Figure 5:
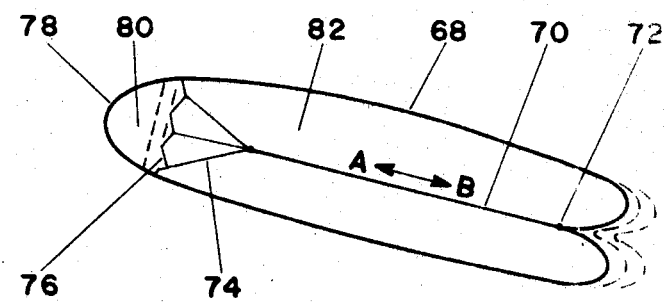
FIG. 5 is a cross-sectional view of the wing of FIG. 1, showing a second means of superpressuring the wing.

FIG. 5 shows still another method of changing the volume or superpressuring the inflated wing of FIG. 1. In accordance with FIG. 5, the main body section or center section of the wing is represented by numeral 68. The nose of the body section is represented by 78 and nose chamber 80. Attached internally in nose chamber 80 is an internal curtain 76, lines 74 lead from curtain 76 to a single line 70. The single line 70 passes out of the trailing or rear end of center section 68 and has formed near its exit a knot or other device to lock line 70 in a predetermined position as it passes out the rear end of the chamber. By pulling on curtain 76 by means of line 70 and locking line 70 relative to the trailing end of the center section 68, the volume of chamber 82 of section 68 may be contracted. By releasing or unlocking knot 72 section 68 may be expanded as shown by the dotted trailing end configurations. Thus, by moving line 70 in the direction A the volume may be enlarged and the internal pressure reduced; and by moving line 70 in the direction B the volume 82 is reduced, the internal pressure is increased and the device is superpressured.

Figure 6:
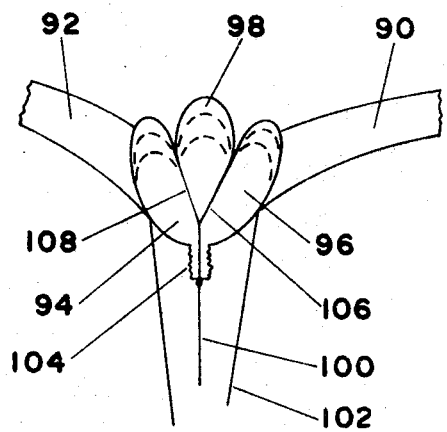
FIG. 6 is a cross-sectional view of the wing of FIG. 2 showing another means of repressuring the wing.

FIG. 6 shows, in more detail than previously, the method of superpressuring the center section of the vehicle of FIGS. 2 and 3. A vehicle such as that shown in FIGS. 2 and 3 has the three petal sections 94, 96 and 98, as previously described. These petal sections meet at two points, at which are attached the curtains 106 and 108 and of course the lead lines from which these curtains pass out of the chamber as single lead line or superpressure control line 100. Control line 100 passes through superpressure tube 104. The side sections of this particular vehicle are shown as 90 and 92. These sides have attached thereto tether or load lines 102. As shown by the dotted configurations of petals 94, 96 and 98 in FIG. 6, the volume of this chamber may be changed by simply pulling on superpressure control line 100. As the line is pulled downwardly the volume is reduced and the internal pressure increased; whereas, by releasing the line 100 the volume increases and the internal pressure decreases.

Referring now to FIGS. 7 through 12 the method and apparatus for launching the inflated, buoyant wing are illustrated. In FIGS. 7 through 12 the numeral 110 represents a gas carrying trailer which is adapted to supply the appropriate gas for inflation of the wing. This gas trailer is connected through line 112 to delta-shaped buoyant wing 114 which is shown in FIG. 7 in its essentially depressured condition for storage or transport. The wing 114 is disposed or supported in a trough-shaped carrier vehicle 118. Carrier 118 is mounted on appropriate transport wheels 119. Wheels 119 are pivotal and will permit the device to pivot or turn in any given direction. This is particularly helpful since the vehicle will turn in the proper direction with respect to the wind when the vehicle is ready for launching, thereby automatically placing wing in position for launching. The carrier 118 has attached to its forward end a winch 116. The lines, that is, both the control lines 156 and the load lines 120 of wing 114, pass downwardly to appropriate hooks or other devices in the carrier vehicle 118 and thence forwardly to winch 116. FIG. 7 shows vehicle 114 in its deflated condition lying in trough 118 preparatory to inflation. When the inflation gas has been introduced to vehicle 114, from gas trailer 110, the vehicle 114 assumes the condition shown in FIGS. 8, 9 and 12. In this condition, the vehicle is not superpressured, or is essentially depressured, so that it may be folded or otherwise compressed and its size reduced for transport or storage in a hangar, such as hangar 130 of FIG. 12. It should be noted at this point that normally the vehicle is not deflated for storage or transport but is simply depressured so that it can be reduced in size. To reduce the size of the depressured vehicle 114 the side booms or wing tips 115 and 117 are folded underneath center chamber 132 and clamped in this position as shown particularly in FIG. 9. In this situation, superpressure control line 156 has, of course, been released to permit the volume of the interior of wing 114 to enlarge and the internal pressure to be reduced. In the superpressuring operation, which then takes place preparatory to launching of the vehicle, the wing tips 115 and 117 are unclamped and the superpressuring control line 156 is pulled down and locked in position, as will be hereinafter described, to reduce the volume of wing 114, increase the internal pressure and thus superpressure the vehicle. This superpressure condition is shown in FIGS. 10 and 11 of the drawings. It is to be noted in FIG. 11 that the internal volume of wing 114, and particularly that of central chamber 132, has been reduced to thereby superpressure the vehicle. This, of course, follows from the fact that the same quantity of gas is maintained in the vehicle while reducing its size. It should again be pointed out that normally it is not desired to change the amount of gas within the vehicle since the gas is expensive and every effort is made to retain it indefinitely if possible. FIG. 10, therefore, shows the superpressured vehicle with load lines 120 and, of course, superpressure lines 156 unreeled from winch 116 and ready for launching. Such launching will, of course, be effected by the further release of tether or load line 124 from winch 116. As previously pointed out, when it is desired to store the vehicle the winch 116 would be operated to lower the vehicle by means of tether line 124, the superpressure control lines 156 would be manipulated to increase the volume and thus depressure the vehicle, the wings 115 and 117 would then be folded beneath and clamped, as shown in FIG. 9, and the winch 116 would then pull the vehicle downward to the position shown in FIG. 12 for storage in a hangar, such as hangar 130, or for transport. While normally it would not be considered a seriously difficult problem to launch a gas-filled vehicle it should be recognized that in the launching of the vehicle of the nature described herein, many tons of pull are exerted by the vehicle when it is completely pressurized. This thus requires the use of the winch for controlling the lines as well as the carrier vehicle as described in FIGS. 7-12.

Figure 13:
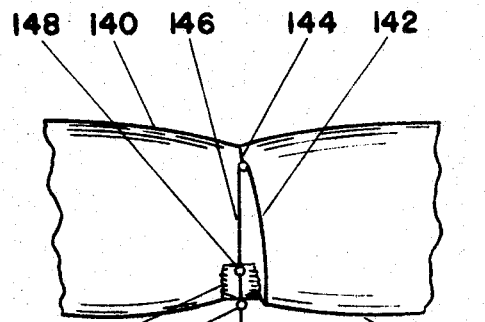
FIGS. 13, 14 and 15 are cross-sectional views of a portion of a superpressuring mechanism which may be used in wings of the present invention.
Figure 14:
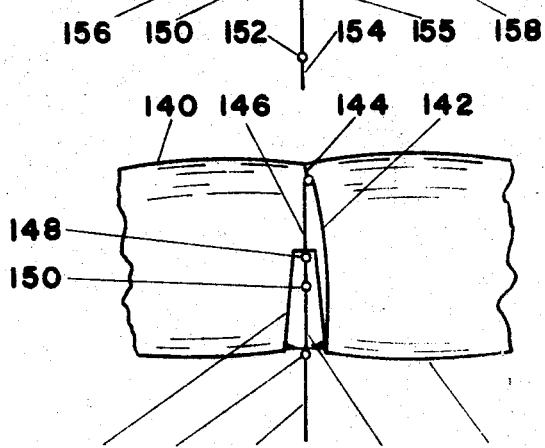
Figure 15:
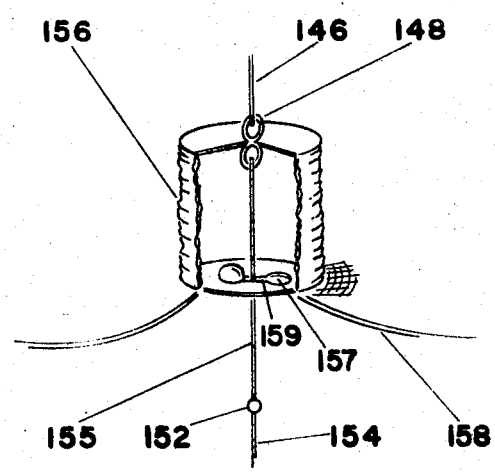

The details of a simple superpressure device, utilizing the previously-mentioned, superpressure tubes and lines are shown in FIGS. 13 through 15. The numeral 158 designates the vehicle or the chamber which is to be changed in volume. The numeral 156 shows the superpressure tube disposed in chamber 158. Passing through superpressure tube 156 and into chamber 158 is a superpressure control line having sections 154, 155, 146 and 142. Line section 142 has one end attached to the bottom of chamber 158 and then passes through an appropriate ring or pulley mounted on internal curtain 144 to then become section 146. Line section 146 terminates inside pressure tube 156 and is held in the upper end of the pressure tube and prevented from sliding out of the pressure tube by means of knot 148. Spaced below knot 148 at the top of section of 155 of the superpressure control line is a second knot 150 and at the bottom of section 155 of the line and dividing the line from section 154 is another knot 152. As shown in FIG. 13, if knot 150 is drawn down through pressure tube 156 until it passes through aperture 157, and, if line section 155 is then slid sidewise to hook the knot 150 under the slot 159, the line may be locked in a lowermost position as shown in FIG. 13. In this position, the chamber 158 has its volume reduced and it is superpressured. When it is desired to depressure or reduce the superpressure, this is done by simply sliding the line out of slot 159 letting knot 150 pass upwardly through aperture 157 and into superpressure chamber 156. The knot 152 may then be locked beneath slot 159 to hold the line in this position by again sliding the line through the slot. This of course is the condition shown in FIG. 14 where the pressure has been released and chamber 158 has assumed its largest volume or low pressure volume. Of course any number of knots or stops could be used to accomplish various intermediate superpressure conditions.

Figure 16:
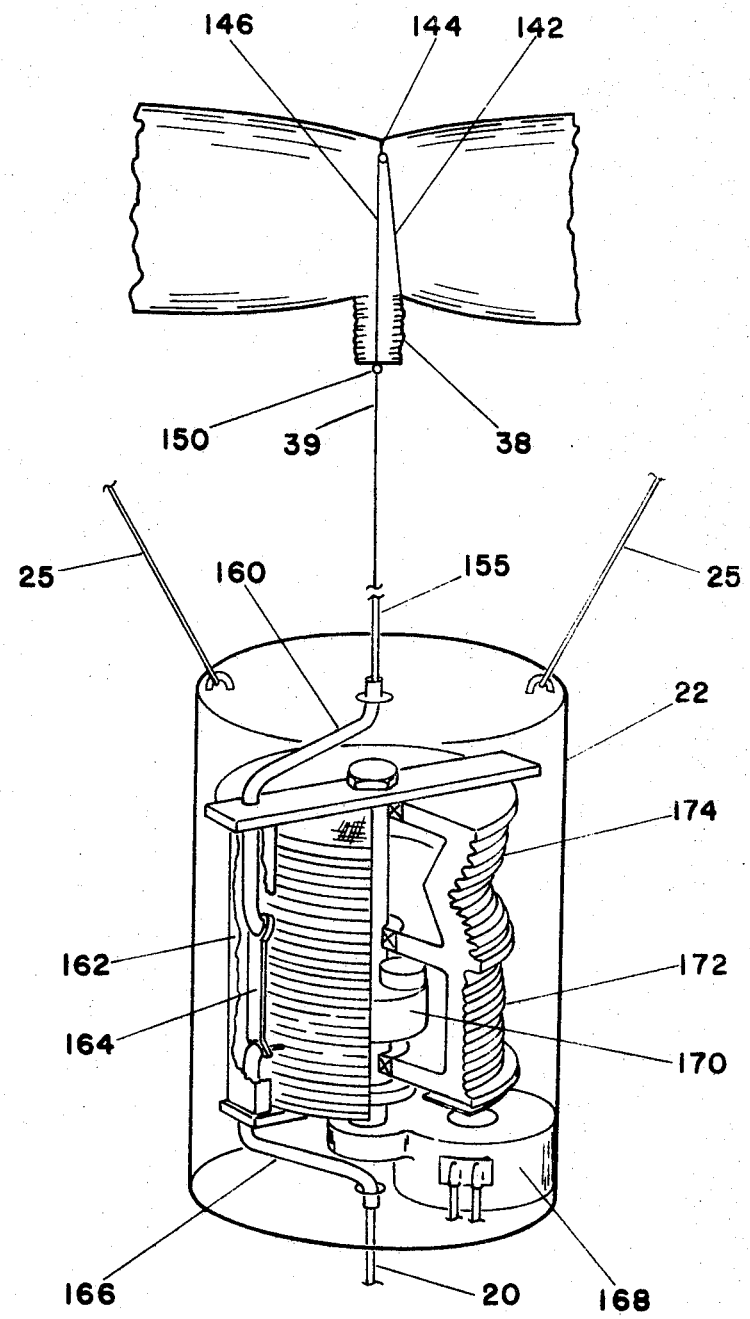
FIG. 16 is an isometric view, partially in section, detailing a superpressuring mechanism.

FIG. 16 shown, in detail, a superpressuring device for superpressuring a vehicle, such as that shown in FIGS. 1 and 4, and at the same time generating electricity. As previously pointed out in connection with FIGS. 1 and 4, the vehicle is provided with an internal curtain 144, superpressuring line sections 142 and 146 lead to superpressure control lines 39, and thence to single superpressure control line 155. Control lines 39 are held in a given position with respect to superpressure tube 38 by means of knot 150. Superpressure device 22 is generally disposed at the confluence point of the load lines 25. Load lines 25 are, as shown, fixedly attached to the top of the superpressure device. Passing out the bottom of superpressure device 22 is tether or load line 20. Load line 20 passes through fairlead 166 and link 164. Fairlead 166 is attached to key slot 162, which has its opposite end connected to fairlead 160. Superpressure line 155 passes through fairlead 160 and link 164. Link 164 thus acts to control the separation between lines 20 and 155 to thereby provide a level wind unit to at all times keep the lines in their proper grooves as they are wound on the winding drum. Key slot 162 allows link 164 to move upwardly and downwardly in a generally vertical direction. Lines 20 and 155 are wound in opposite directions in spiral groove sections 172 and 174, respectively, of the drum. Spiral grooves 172 and 174 have their depths preselected so as to produce a mechanical advantage between lines 20 and 155 and the spiral groove 174 is contoured in a preselected manner to control the level of superpressure which can be maintained in the vehicle. Since sections 172 and 174 are a single unitary drum the two lines 20 and 155 operate in unison. When superpressure line 155 needs to be pulled out of superpressure device 22, in order to allow the volume of the vehicle to increase and thereby alleviate a superpressure load for whatever condition it may have developed, this in turn allows line 20 to be let in. Thus, the torque on each drum is balanced against the torque on the other drum under all conditions. The automatic rotation of the drum of superpressure device 22, due to changing conditions surrounding the vhicle, or the deliberate operation of the superpressure device 22, by pulling on the tether line 20, can be utilized as an economical and advantageous means for generating electricity. For this purpose a generator 168 is driven by the rotation of the drum through generator gearing 170.

While various modifications and vaiations of the present invention have been shown for purposes of illustration, it is to be understood that these examples and illustrations are given for purposes of describing the invention to one skilled in the art and other modifications, variations, and details of construction will be apparent to such skilled artisan and can be utilized without departing from the invention of the present application. Accordingly, the present invention is to be limited only in accordance with the appended claims.

What is claimed is:

1. An inflated, buoyant vehicle comprising:
    (a) at least two separate gas receiving chambers;
    (b) means for creating a differential pressure between said chambers; and
    (c) turbine means including an electrical generator operatively disposed between said chambers and adapted to be operated by said differential pressure to generate electricity.

2. A vehicle adapted to be supported by the atmosphere in an elevated position above the earth comprising:
    (a) a generally-flat, delta-shaped, horizontally-disposable body member having booms extending along the sides and lengthwise through the center thereof;
    (b) said booms being flexible and inflatable;
    (c) turbine means including an electrical generator separating said side and center beooms and operable by a differential pressure created between said side and center booms to generate electricity;
    (d) load-line means attached to said body member and leading to a remote location;
    (e) superpressuring means operatively associated with said inflatable portion of said body member and adapted to controllably change the volume of at least a portion of said inflatable portion of said body member;
    (f) superpressuring-line means operatively connected to said superpressuring means and leading to a remote location;
    (g) control flap means connected to the rearward portion of the vehicle at an acute angle with respect to a centerline passing through said body of said vehicle from front to rear, oriented with respect to said body of said vehicle to control the horizontal movement of said vehicle; and
    (h) control flap line means connected to said control flap means and leading to a remote location.

3. A vehicle adapted to be supported by the atmosphere in an elevated position above the earth comprising:
    (a) a generally-flat, delta-shaped, horizontally-disposable body member;
    (b) at least a portion of said body member being flexible and inflatable and including an elongated centrally disposed boom extending the length of said body member having a cross-sectional configuration generally resembling three petals located side-by-side;
    (c) load-line means attached to said body member and leading to a remote location;
    (d) superpressuring means operatively associated with said inflatable portion of said body member and adapted to controllably change the volume of at least a portion of said inflatable portion of said body member;
    (e) superpressuring-line means operatively connected to said superpressuring means and leading to a remote location;
    (f) control flap means connected to the rearward portion of the vehicle at an acute angle with respect to a centerline passing through said body of said vehicle from front to rear, oriented with respect to said body of said vehicle to control the horizontal movement of said vehicle; and
    (g) control flap line means connected to said control flap means and leading to a remote location.

4. A vehicle in accordance with claim 3 wherein the superpressuring means includes curtains attached to the interior of the inflatable section at the points of juncture of the petals and the superpressuring line means is operatively attached to said curtains.

5. A vehicle adapted to be supported by the atmosphere in an elevated position above the earth comprising:
    (a) a generally-flat, delta-shaped, horizontally-disposable body member;
    (b) at least a portion of said body member being flexible and inflatable;
    (c) load-line means attached to said body member and leading to a remote location;
    (d) superpressuring means including a line attached to the interior of said inflatable portion of said body member in a manner to pull one surface of said inflatable portion toward the opposing surface and controllably change the volume of at least a portion of said inflatable portion of said body member;
    (e) said superpressuring-line means passing through a compressible generally cylindrical tube within said inflatable portion and thence through a keyhole-type hole and having at least one knot adapted to pass through the enlarged portion of said hole but not through the slot portion of said hole;

(f) control flap means connected to the rearward portion of the vehicle at an acute angle with respect to a centerline passing through said body of said vehicle from front to rear, oriented with respect to said body of said vehicle to control the horizontal movement of said vehicle; and (g) control flap line means connected to said control flap means and leading to a remote location.

6. A superpressuring device for an inflated, buoyant vehicle comprising:
 (a) a base member;
 (b) drum means rotatably mounted in said base member;
 (c) a superpressure line having one end operatively and remotely connected to said vehicle;
 (d) a tethering line having one end at a remote location;
 (e) said drum means including two separate winding sections adapted to receive the opposite end of said superpressure line and the opposite end of said tethering line respectively; and
 (f) load line means leading from said vehicle to said base member and fixedly connected to each;
 (g) said superpressure line and said tethering line being oppositely wound on their respective winding sections of said drum means whereby as one of said lines is unwounded from said drum means the other of said lines is wound on said drum means.

7. A device in accordance with claim 6 which additionally includes an electrical generator operably connected to the drum means whereby rotation of said drum means operates said generator to generate electricity.

8. A device in accordance with claim 6 wherein the superpressure line and the tethering line pass through opposite ends, respectively, of an elongated link means whereby said link means maintains separation between said lines and moves parallel to the axis of the drum means as said lines are wound about and unwound from said drum means.

References Cited
UNITED STATES PATENTS

| | | |
|---|---|---|
| 870,430 | 11/1907 | Hervé. |
| 1,770,675 | 12/1926 | Short. |
| 2,463,517 | 3/1949 | Chromak. |
| 3,033,529 | 5/1962 | Pierrat. |
| 3,212,730 | 10/1965 | Tschudy et al. |

FOREIGN PATENTS 130,657    1919    Great Britain.

FERGUS S. MIDDLETON, Primary Examiner

J. L. FORMAN, Assistant Examiner

U.S. Cl. X.R.

244—43, 116, 138